(No Model.)
M. W. ILES.
PROCESS OF AND APPARATUS FOR THE SEPARATION OF MATTE FROM SLAG.
No. 494,570. Patented Apr. 4, 1893.
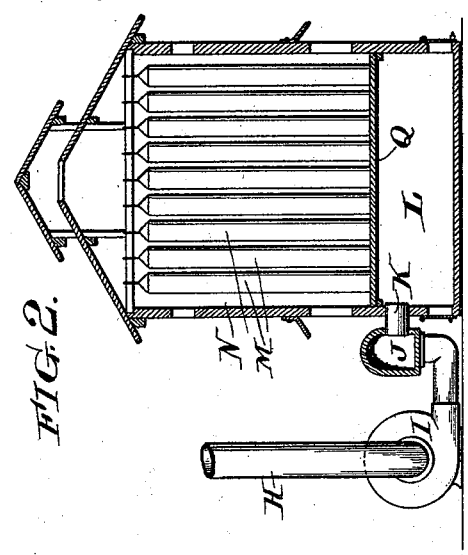
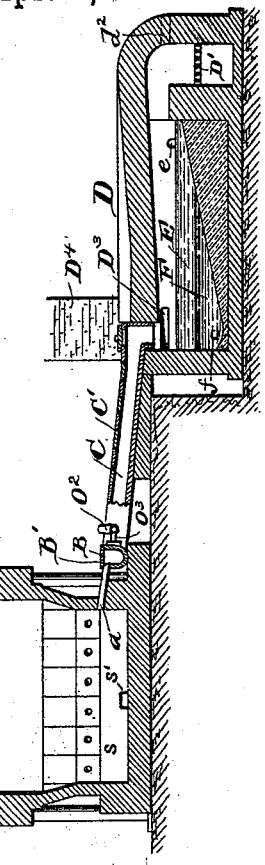
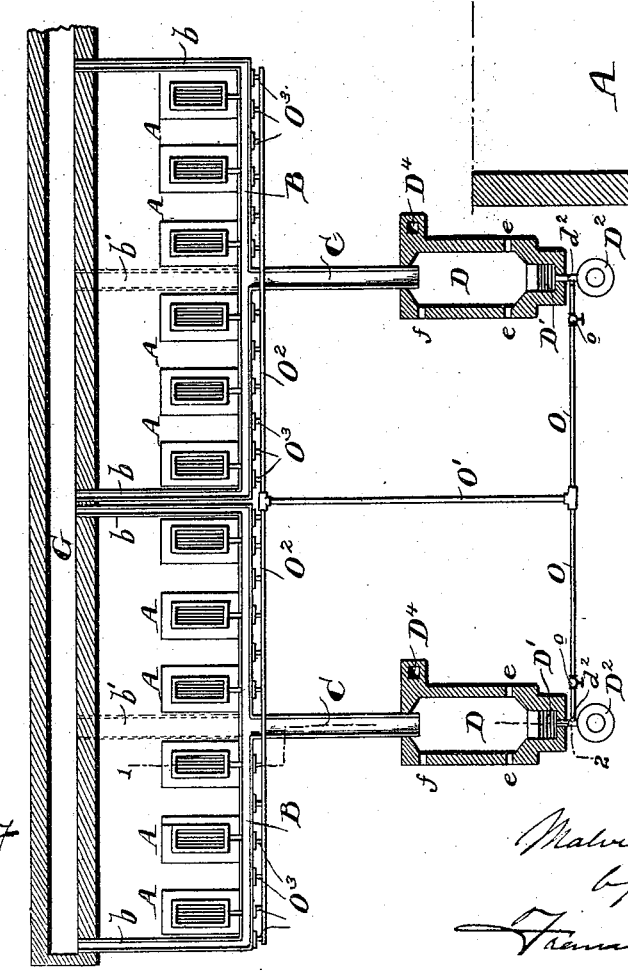
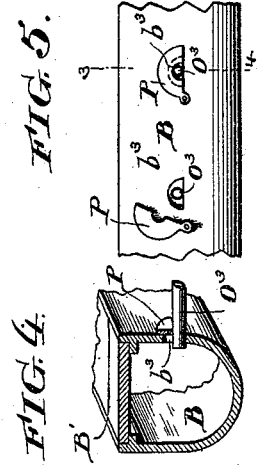

United States Patent Office.

MALVERN W. ILES, OF DENVER, COLORADO.

PROCESS OF AND APPARATUS FOR THE SEPARATION OF MATTE FROM SLAG.

SPECIFICATION forming part of Letters Patent No. 494,570, dated April 4, 1893.

Application filed March 5, 1892. Serial No. 423,837. (No model.)

*To all whom it may concern:*

Be it known that I, MALVERN W. ILES, of Denver, county of Arapahoe, State of Colorado, have invented a certain new and useful Improved Process of and Apparatus for the Separation of Matte from Slag, of which the following is a true and exact description, reference being had to the accompanying drawings, which form a part of this invention.

My invention relates to the separation of matte from the slag produced in metallurgical furnaces such as those used in argentiferous lead smelting; my object being to effect a more thorough and perfect separation of the matte from the slag than has heretofore been generally practicable, and also to save such metallic fumes given off by the slag and matte while being collected and treated; my invention in fact not only insures a great gain in the metals saved but also, by protecting the workmen from fumes, effects a great gain in human life and health. Among the best methods for saving matte now practiced consists in the interposition of a matte pot, box or other separator between the tap-hole of the furnace and the slag pot, the mixed matte and slag being run into the separator; at the bottom of which, matte will accumulate by virtue of its specific gravity while the somewhat impoverished slag flows off from the top into the slag-pots. Thus treated, however, a comparatively large amount of matte is not precipitated in the settling-basin but passes with the slag into the slag pots and it has therefore been found economical to save and re-smelt very large portions of the original slag. Even with such careful treatment as above indicated it is recognized that there is still a considerable loss of metal, particularly of silver.

In another application filed by me December 21, 1891, Serial No. 415,696, I have described an improvement in the method of separating matte from slag in which I employ a large covered matte box or fore hearth insulated to prevent, as far as possible, the escape of heat and in which the slag running from the furnace is kept in a fluid state by its own heat, the matte being at intervals tapped off from the bottom while the slag is permitted to run from the top. This plan of keeping the slag in a fluid condition and giving the matte more time to settle, gives greatly improved results in the saving of the metallic particles and matte globules. But I have discovered that materially better results can be obtained by treating the matte-carrying slag in an independently-heated furnace preferably of the reverberatory type and of a considerable capacity. Treated in this furnace the slag can be brought to and maintained in a highly fluid condition, and, being in considerable mass, the conditions are in every way adapted to facilitate the thorough subsidence of matte particles. In the operation of this furnace, the matte is tapped off from time to time from the bottom, and the slag permitted to escape from the upper level.

In using this method and apparatus the reverberatory furnace should preferably be placed in close proximity to the blast furnace or furnaces in which the matte and slag is formed, and be connected therewith by a steeply-inclined trough so placed as to receive all the matte and slag from the blast furnace or furnaces and carry it to the reverberatory furnace. These troughs or conduits should be heated to avoid the risk of the slag chilling in them. And this is best accomplished by providing the troughs with thick covers, composed of some good non-conductor of heat and passing the products of combustion from the reverberatory furnace through the large covered troughs. A proper draft through the troughs can be insured by connecting them with the smoke flues or dust-chamber, to which the blast furnaces are attached.

It is well-known that metallic fumes, valuable in themselves, but injurious to the health of the workmen, arise from the hot matte and slag issuing from the blast-furnaces; and such fumes are also driven off in my slag furnace. Now, by connecting the large troughs with the smoke conduits to which the blast-furnaces are attached and then screening the smoke and products of combustion by passing them through textile fabric or other suitable screens in the well-known way, all the solid particles including the metallic fumes are arrested and saved, including those given off by the matte and slag after it leaves the blast furnace.

Reference is now had to the drawings which illustrate my invention, and in which,—

Figure 1 is a plan view, or rather diagram, illustrating an advantageous combination of smelting furnaces, slag conduits, and smoke flues embodying the principles of my invention. Fig. 2 is an elevation in section showing the bag-house or screen-house and its connection with the smoke flue; Fig. 3 a cross-sectional view taken on the line 1—2 of Fig. 1; Fig. 4 a perspective view of a section of the large slag trough; and Fig. 5 a side view of a section of the slag trough.

A A A, &c., are the smelting furnaces in which the slag and matte is produced. As shown in Fig. 1, twelve such furnaces are represented connected in two groups of six each with the reverberatory slag furnaces D D.

B B are slag troughs supported in front of the furnaces so that the slag therefrom will run into them from the taps $a$; the metals smelted from the ores, collecting in the crucible $s$ beneath the slag and matte tap $a$, and being removed in any of the well known ways, for instance through the metal tap $s'$; the troughs being inclined to the point where they deliver the slag which, as represented, is their junction with the inclined trough C which leads from them to the furnaces D D.

B' B' C' C' are fire-brick, magnesia brick, or similar non-conducting material serving as covers for the troughs as illustrated best in Fig. 4. The reverberatory furnaces D should be made with steeply-inclined bottoms as illustrated in Fig. 3, provided with a tap-hole $f$ for the removal of the matte situated at their lowest point, and tap-holes $e$ at the upper level of the slag through which the slag is drawn off.

F in the drawings indicates the accumulated matte in the bottom of the furnace, and E the layer of slag above it.

The furnace D may be heated in any convenient way as by a fire on grate D'; but preferably by gas drawn for instance through generators indicated at $D^2$ $D^2$ from which gas-pipes $d^2$ enter the furnaces.

$D^3$ indicates an outlet for products of combustion into a stack $D^4$. The gases from the furnaces may be drawn off in this way when, for any reason, it is not convenient to use the slag troughs C B as flues.

As shown the troughs B B are provided with flues $b\,b$, &c., leading from their ends or highest point to the dust chamber G of the blast furnaces which forms a part of their smoke flue system. If desired flues, as indicated at $b'$, may be used in place of the flues $b$.

The various fumes and products of combustion passing into the dust chamber G issue therefrom through a series of cooling flues not represented and are finally drawn through a conduit H by a blower I and delivered to a conduit J from which they pass through delivery pipes K into chambers L situated beneath a room N in which are suspended a large number of bags M M, &c., these bags connecting at their lower ends with the chambers L through perforations in the partition or floor Q. The gases will escape through the fabric of the bags while the solid particles are collected in the chambers L and can be again charged after ignition into the blast-furnaces.

O O are gas pipes leading from the gas producers indicated at $D^2$ and each provided as shown with a controlling valve $o$. These gas pipes connect with a common pipe O' which, in turn, connects with a pipe $O^2$ lying alongside of the covered slag troughs B B and connecting with its interior by a series of burner nozzles $O^3$ passing through openings $b^3$ in the troughs. These openings are controlled by slides or valves P by adjusting which any desired amount of air can be permitted to enter the trough along with the gas.

In operation the slag from the furnaces A is tapped off in the usual way but flows into the covered troughs B and through them and the trough C into the reverberatory furnaces D connected with said troughs. In these slag furnaces the slag is brought and maintained in a state of fusion and the separation of the matte and slag effected as above described. The products of combustion from the slag furnaces being drawn off through the trough C keep it at a sufficiently high temperature to prevent any chilling of the slag as it passes through it; and by causing it to pass also through the troughs B they also receive the benefit of the otherwise waste heat from the reverberatory furnace. In this way also the heat of the slag itself is saved and utilized acting to keep the slag in the troughs in a proper state of fluidity. The metallic fumes from the slag furnace and troughs are carried backward into the smoke chamber of the blast furnaces and are saved in the bag-house together with the metallic fumes from the blast furnaces themselves.

In order to insure a proper degree of temperature in the troughs at all times it may be advisable to provide some extraneous means of heating them in addition to the stored heat of the slag and the heat of the products of combustion from the slag furnace. To this end I have provided the arrangement of gas burners entering the upper part of the troughs B and which can be ignited at proper times or whenever there is danger of the slag chilling in the troughs.

I prefer and recommend the use of the reverberatory furnace because the direct impingement and radiation of the heat and flame upon the slag is the most economical way of maintaining the necessary temperature in the mass under treatment, and I recommend the use of the furnace with the inclined bottom for four reasons; first, because it provides a relatively small basin for the accumulation of the subsided matte; second, because it secures a relatively large surface upon which the heat can act; third, because it secures a deep body of slag immediately below the point at which the fluid matte carrying slag is forced into the furnace; this is advantageous because the matte prills being heavier than the slag have greater momentum and tend to separate at this point by being impinged down through the slag upon the accumulated matte at the bottom, with which they merge; and fourth, because on its passage from the deep portion of the inclined bottom to the shallow portion thereof the slag travels from end to end of the furnace thereby affording full opportunity for the matte particles to separate, the sloping bottom acting as a collector for the suspended matte particles in the slowly moving current of slag.

Having now described my invention, what I claim as new, and desire to secure by Letters Patent, is—

1. The process of separating matte from slag which consists in removing the matte-containing slag from the place of formation to an independently heated furnace, maintaining the mass in a state of fusion therein by heat reverberated upon its surface to induce a subsidence and separation of the matte, substantially excluding from said furnace any metal produced at the formation of the matte and slag, and then drawing off the separated matte and slag in separate vessels.

2. The process of separating matte from slag which consists in removing the matte-containing slag from the place of formation to an independently heated furnace having an inclined bottom, maintaining the mass in a state of fusion therein by heat reverberated upon its surface to induce a separation and subsidence of the matte, and then drawing the matte from the lowest part of the inclined furnace bottom, and the slag from the upper part of the furnace.

3. The process of separating matte from slag which consists in removing the matte-containing slag from the place of formation, transporting it in a fluid condition to an independently heated furnace having an inclined bottom, and pouring the fluid mass into said furnace over the deeper parts thereof, maintaining the mass in a state of fusion by heat reverberated upon its surface to effect a subsidence and separation of the matte in the deeper part of the furnace, and drawing off the slag from the upper part thereof.

4. The process of separating matte from slag which consists in first separating the mixed matte and slag from the metal in the blast furnace, then removing the matte and slag from the place of formation to an independently-heated furnace, maintaining the mass in a state of fusion therein to effect the subsidence and separation of the matte, and running the slag from the upper and the matte from the lower part of said independent furnace.

5. The process of separating matte from slag, which consists in first separating the mixed matte and slag from the metal in the blast furnace, then removing the matte and slag from the place of formation to an independently heated furnace and maintaining the mass in a state of fusion therein by heat reverberated upon its upper surface to effect the subsidence and separation of the matte, and running the slag from the upper and the matte from the lower part of said independent furnace.

6. The process of separating matte from slag, which consists in removing the matte-containing slag from the place of formation, transporting it in a fluid condition to an independently heated furnace having an inclined bottom, introducing it at the deep end of said furnace and drawing off the slag from the shallow end thereof.

7. The process of separating matte from slag which consists in first separating the mixed matte and slag from the metal in the blast furnace, then running the matte and slag from the place of formation through inclined conduits to an independently-heated furnace, maintaining the mass in a state of fusion therein to effect the subsidence and separation of the matte, and running the slag from the upper and the matte from the lower part of said independent furnace.

8. The process of separating matte from slag which consists in first separating the mixed matte and slag from the metal in the blast furnace, then running the matte and slag from the place of formation through inclined heated conduits to an independently-heated furnace; maintaining the mass in a state of fusion therein to effect the subsidence and separation of the matte, and running the slag from the upper and the matte from the lower part of said independent furnace.

9. The process of separating matte from slag which consists in drawing the matte and slag from two or more furnaces, conducting said slag in conduits to a common independently-heated furnace and there drawing the matte and slag from different levels.

10. The process of separating matte from slag which consists in drawing the matte and slag from two or more furnaces, conducting said slag in conduits to a common independently-heated furnace and there drawing the matte and slag from different levels; and drawing the products of combustion from the independent furnace through the conduit by which the slag enters it in order to maintain a high heat therein.

11. The process of separating matte from slag which consists in drawing the matte and slag from two or more furnaces, conducting said slag in conduits to a common independently-heated furnace and there drawing the matte and slag from different levels; drawing the products of combustion from the independent furnace through the conduit by which the slag enters it in order to maintain a high heat therein; and conducting said gases and contained fumes into the smoke chamber of the slag-producing furnaces.

12. In combination with a furnace having a metal-collecting well or crucible and a matte and slag tap above said well or crucible, an independently-heated furnace to receive the matte and slag having tap-holes at different levels as described, and a conduit leading from the slag tap-hole of the first furnace to said independent furnace substantially as specified.

13. In combination with a furnace having a metal-collecting well or crucible and a matte and slag tap above said well or crucible, an independently-heated furnace to receive the matte and slag having tap-holes at different levels as described, and a heated conduit leading from the slag tap hole of the first furnace to said independent furnace, substantially as specified.

14. The combination with a slag-producing furnace of an independently-heated reverberatory furnace adapted to receive and heat the slag; a smoke chamber and conduits leading from the slag-producing furnace to a screen system adapted to separate and save the solid parts of the products of combustion and smelting; and a flue leading from the reverberatory furnace to the smoke conduits aforesaid.

15. The combination with a slag-producing furnace of an independently-heated reverberatory furnace adapted to receive and heat the slag; an inclined covered slag conduit connecting said furnaces; a smoke chamber and conduits leading from the slag-producing furnace to a screen system adapted to separate and save the solid parts of the products of combustion and smelting; and conduits leading from the upper part of the slag conduit to the smoke conduits aforesaid.

16. In combination with a slag-producing furnace or furnaces, a covered slag-conducting trough leading therefrom, a smoke conduit leading from the furnaces to a screen system adapted to separate and save the solid particles of the products of combustion; and a connection or connections from the slag trough to said smoke conduits.

17. The combination with a series of slag-producing furnaces, of a common inclined and covered trough adapted to receive slag from all of them and conduct it to a point of delivery; and a smoke and fume conduit leading from said trough.

18. The combination with a series of slag-producing furnaces, of a common inclined and covered trough adapted to receive slag from all of them and conduct it to a point of delivery; a smoke and fume conduit leading from said trough, and a series of gas-burners $O^3$ leading into the trough at suitable intervals.

19. The combination of a series of slag-producing furnaces, a smoke conduit G adapted to receive smoke therefrom an independently-heated reverberatory furnace, covered slag troughs leading from the slag-producing furnaces to the reverberatory furnace, said troughs serving as the smoke flue of the reverberatory furnace; and smoke conduits leading from the upper parts of the slag troughs to the smoke conduits of the slag-producing furnaces.

MALVERN W. ILES.

Witnesses:
F. P. McCORMICK,
JOHN S. WILLIAMS.